L. W. BOYNTON.
APPARATUS FOR DRYING WOOL.
No. 62,468. Patented Feb. 26, 1867.
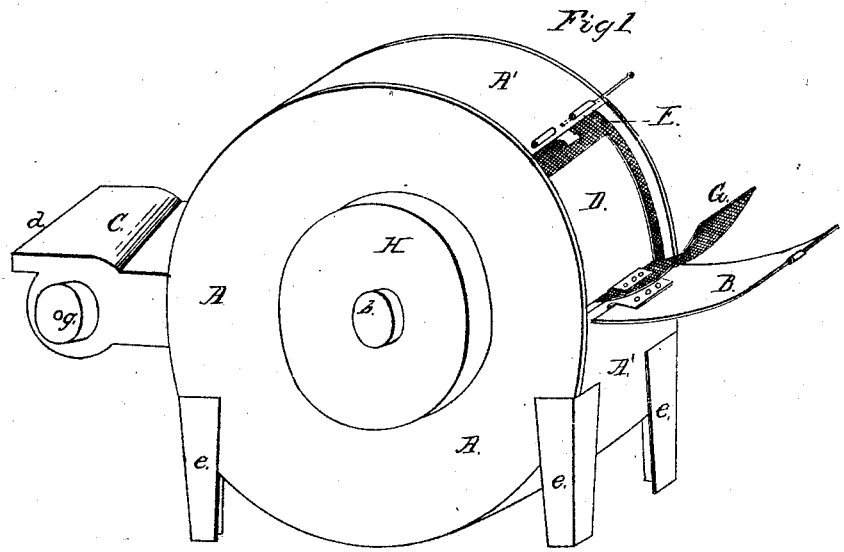
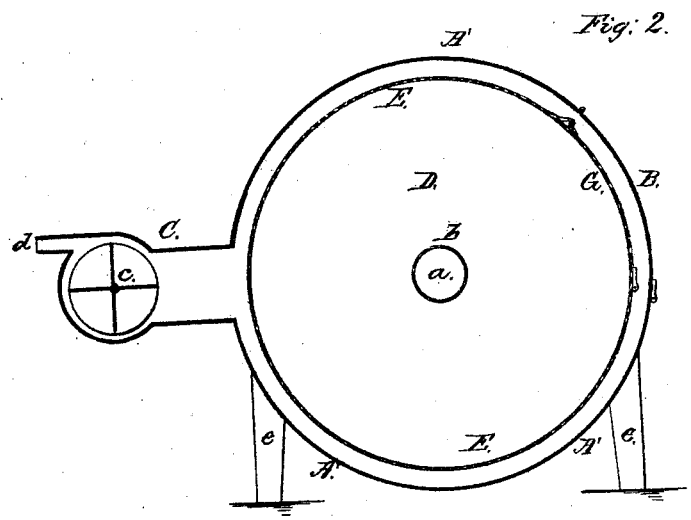
Witnesses:
E. W. Baldwin,
R. Fitzgerald,
Inventor:
L. W. Boynton

United States Patent Office.

LEANDER W. BOYNTON, OF HARTFORD, CONNECTICUT.

Letters Patent No. 62,468, dated February 26, 1867.

---

APPARATUS FOR DRYING WOOL.

---

The Schedule referred to in these Letters Patent and making part of the same.

---

TO ALL WHOM IT MAY CONCERN:

Be it known that I, LEANDER W. BOYNTON, of the city and county of Hartford, in the State of Connecticut, have invented a new and useful improvement in Apparatus or Machinery for Drying or Desiccating Wool, &c.; and I do hereby declare that the following is a full, clear, and exact description of the construction, character, and operation of the same, reference being had to the accompanying drawings, which make part of this specification, in which—

Figure 1 is a perspective view of the whole apparatus or machine, showing the doors open for feeding or discharging the wool, a portion of the perforated periphery of the cylindrical vessel which contains the wool while being dried, the central perforated tube, and the outside of the eduction port with the pulleys.

Figure 2 is a plan of the same cut vertically through the centre, showing the internal structure of the apparatus.

My improvement consists in making or using a cylindrical vessel, the periphery of which is finely perforated, or made of wire cloth, or any other analogous substance, with solid or closed ends or heads, and with a finely perforated tube passing horizontally through its centre, to serve as an axis on which it is to be revolved while in use; and in making or using a cylindrical case, (in which I place the vessel with the perforated periphery, before named,) with solid or closed heads or ends, except where the journals of the axis of the internal cylinder pass through and have their bearings; and with a closed periphery, except a door for feeding and discharging, (which door should be made essentially steam-tight,) and an eduction port, which is at the end of a flat tube or spout, in which I place or fit an exhausting fan, so that the high steam may be let in through the perforated tubular axis, when it will percolate through the wet wool, and, by its superabundant heat, convert the moisture in the wool into steam, and be all carried out together at the eduction port by the action of the exhausting fan, leaving the wool essentially dry.

I make the external case of wood, or any other suitable material, in a cylindrical form, as shown at A A and A' A', fig. 1, and indicated in section in fig. 2. I make it solid or close on its two vertical heads or ends, except a hole through the centre, as indicated at a, fig. 2, to receive and serve as bearing for the journals of the axis b of the internal or receiving cylindrical vessel B; and I make the periphery A' A' close or solid, except that I make a door in the front portion of the periphery, as shown at B, fig. 1, and indicated at B, fig. 2, through which I feed or discharge the wool; and to the rear portion of the periphery I fit a suitable flat tube, the outside of which is shown at C, fig. 1, and its internal structure is indicated in section in fig. 2, where a section of the exhausting fan is also shown at c; and in the extremity of this flat tube C is the eduction port d, as shown in section in fig. 2, through which all of the steam, &c., is to be exhausted by the operation of the fan c; and I support this case on legs, as e e e e, or otherwise. I make the internal cylindrical vessel with close or solid heads or ends of wood, or any other suitable material, as indicated at D, figs. 1 and 2, except that I make an aperture in each, as shown at a, fig. 2, in which I secure a hollow shaft, b, figs. 1 and 2, by which the internal cylindrical vessel is to be revolved when in use; and I make the periphery of this internal vessel of perforated sheet metal, or of wire cloth, as shown at E, figs. 1 and 2, or of any other suitable substance, through which the steam or vapor will freely pass; and in this periphery I make a door, as shown at G, fig. 1, and indicated at G, fig. 2; and I place this vessel D within the external case A A, &c., as shown in figs. 1 and 2. I make the shaft b, figs. 1 and 2, by which the vessel D is to be revolved, of a hollow tube, with its periphery finely perforated, as indicated at b, figs. 1 and 2, so as to allow the high steam (when admitted into either end of it, the other end being stopped,) to pass into and fill the internal vessel D, while its ends serve as journals, and one of them carries a pulley, as H, fig. 1, on which a belt works to revolve the internal vessel when it is used. I make the exhaust fan c of a shaft and four or any other convenient number of wings or vanes, and of a sufficient size to successfully exhaust or carry out all of the steam or vapor which enters or accumulates in the apparatus; and on one end of the arbor or shaft I fit a pulley, as g, fig. 1, which is to be operated or driven by a belt in the usual way, or any other convenient means may be used to operate the fan which will drive it with sufficient velocity for the purpose.

Having made and arranged the parts as before described, connected the steam pipe with the hollow shaft $b$ or induction port, and shipped the belts in their proper order, I open the doors B and G and fill the cylinder D with wet or newly-washed wool, and close the doors. The outer one, B, should be closed essentially steam-tight. I then put on the power upon the belts, one of which on the pulley H will revolve the cylinder D slowly, as two or three revolutions in a minute, while the other belt on the pulley $g$ will revolve the fan $c$ with sufficient velocity to exhaust the case; and I let on the high steam, which will pass through the perforations in the hollow shaft $b$, and percolate through the whole mass of the wool, and, by its superabundant heat, it will convert the moisture which is in the wool into steam, and the whole will be carried out by the exhaust fan $c$ through the eduction port $d$, leaving the wool essentially dry. The steam used should be raised to from four to six atmospheres, (in proportion to the quantity of the wool, &c.,) when three or four minutes will be time enough to dry the wool sufficiently for carding, &c. Probably it would require about as many minutes by this process as it would hours by any process where the steam is not applied directly to the wool. If it be desired to dry the wool so thoroughly as to fit it for packing for storage or transportation, the steam pipe may be removed without stopping the motion of the cylinder D or the fan $c$, and allow warm air (as of the room) to pass through the wool for a few minutes, when the desiccation will be complete.

What I claim as my invention, and desire to secure by Letters Patent, is—

The combination of the internal cylindrical vessel D, and its induction port $a\ b$, with the cylindrical case A A, &c., fan $c$, and eduction port $d$, when the whole is constructed and arranged and made to operate and produce the result substantially as herein described and set forth.

L. W. BOYNTON.

Witnesses:
  E. W. BALDWIN,
  R. FITZGERALD.